Dec. 26, 1939.　　　F. MEINHARDT ET AL　　　2,184,750
COMPARISON MICROSCOPE
Filed Sept. 29, 1937
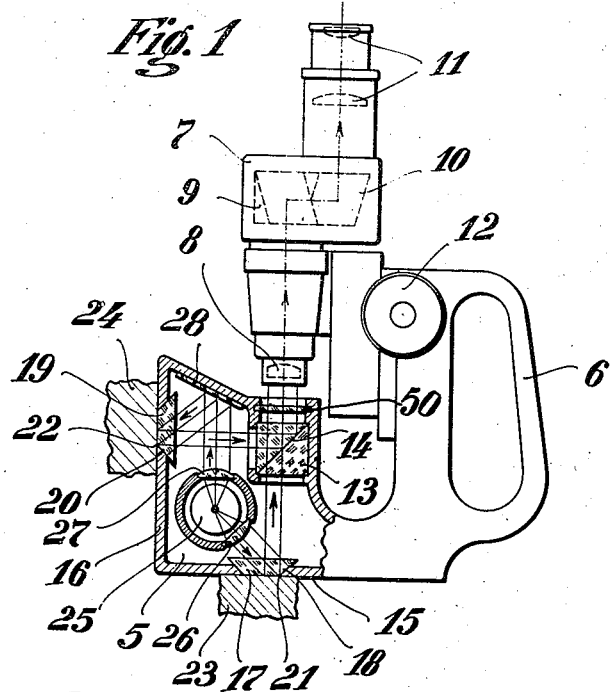
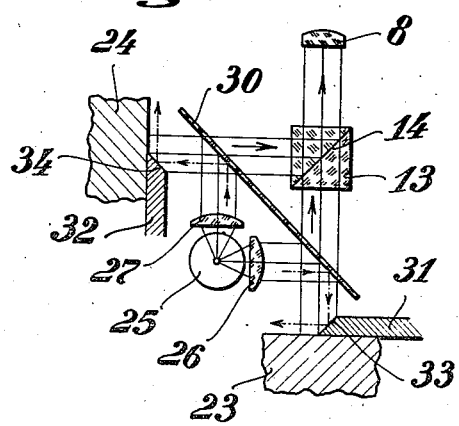
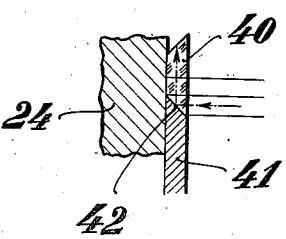
INVENTORS
Fritz Meinhardt
Hans Fricke
BY Ivan E. C. Konigsberg
ATTORNEY Patented Dec. 26, 1939

2,184,750

UNITED STATES PATENT OFFICE 2,184,750

COMPARISON MICROSCOPE

Fritz Meinhardt and Hans Fricke, Wetzlar, Germany, assignors to Ernst Leitz, G. m. b. H., Wetzlar, Germany Application September 29, 1937, Serial No. 166,295
In Germany October 10, 1936

4 Claims. (Cl. 88—39)

Comparison microscopes have heretofore been so constructed that the partly silvered surface in which the two bundles of light rays from the two objects are united is positioned between the two objectives and the ocular. This is a disadvantage because such construction requires the use of two and sometimes four objectives and the apparatus becomes very bulky.

The object of this invention is to provide an optical system for comparison microscopes so arranged that the light rays uniting surface is interposed between the objective and the objects. Another object of the invention is to provide means whereby the light rays from the objects which are not required for observation purposes are reflected in a direction different from the direction of the light rays which pass into the objective and whereby a very sharp dividing line between the two comparison pictures is obtained.

Accordingly the invention is embodied in a comparison microscope and an optical system therefor arranged and constructed as hereinafter set forth and as illustrated in the accompanying drawing in which:

Fig. 1 is a view partly in section and partly in elevation of a comparison microscope embodying the invention.

Fig. 2 is a diagram illustrating an optical system different from that shown in Fig. 1.

Fig. 3 illustrates a modification.

Referring to Fig. 1 the numeral 5 indicates a housing provided with a handle 6. To the housing there is secured a microscope 7 which in this instance is shown as being a stereomicroscope which includes an objective 8, prisms 9 and 10 and an ocular 11. An adjustment for focusing the microscope is indicated at 12. 13 is a glass body for uniting the light rays from the objects in the partly silvered surface 14 in said glass body which is located in optical alinement with the objective axis of the microscope at an angle of forty-five degrees thereto. The housing 5 has a bottom 15 and a rear wall 16 at a right angle to each other, the rear wall being parallel to the plane of the objective axis as shown.

The bottom wall 15 supports a glass plate 17 which is provided with a reflecting surface 18 adjacent the edge 21 of an aperture in which the glass plate is seated. The wall 16 supports a glass plate 19 having a reflecting surface 20 adjacent the edge 22 of the aperture in which the plate 19 is seated. The objects 23 and 24 are illuminated by a lamp 25 supported in a housing which also supports two condensers 26 and 27. 28 is a reflecting mirror. A protecting plane glass plate 50 is placed above the glass body 13. The two objects may be attached to the microscope by any suitable means, not shown, or they may be supported by any other means, not shown, and the microscope simply pushed into operative contact with them. The paths of the illuminating rays are indicated by arrows. The glass bodies and lenses in the drawing are purposely not shown in section for the sake of clearness.

The rays from the lamp for illuminating the object 23 pass through the condenser 26 and the glass plate 17 to the object. One half of this bundle of rays is reflected back into the lamp by the reflecting surface 18. The other half of the bundle of rays illuminates the object 23 and from the latter a certain portion of the rays pass upwardly to the glass body 13. In this body about one half of the light rays coming from the object 23 pass through the partly silvered semi-transparent surface 14 and into the optical system of the microscope. The remaining half of these light rays is reflected to one side towards the wall of the casing. The other object 24 is illuminated by light rays which pass from the lamp through the condenser 27 upwards to the silvered mirror 28 which reflects the rays upon the object through the glass plate 19. One half of this bundle of rays is reflected by the reflecting surface 20 back into the mirror 28 and thence back into the lamp. A certain portion of the other half of said rays pass to the glass body 13 and to the surface 14 which also in this instance lets about one half of the light rays pass through while the other half of this bundle of light rays from the object 24 is reflected upwardly into the optical system of the microscope to form the image therein of the object 24.

It is clear from the drawing that the fields of the objects are so arranged that they are complementary to each other and the image of each occupies one half of the field of view, sharply separated by a line which is an image of the edges 21 and 22. From the prism 13 the light rays pass into the microscope in the usual manner as indicated.

Fig. 2 illustrates an arrangement in which the microscope is represented by the objective 8. Other parts which are similar to the same parts in Fig. 1 are numbered accordingly. The condensers 26 and 27 have their optical axes at a right angle to each other, whereas in Fig. 1 these axes are 130° apart. Between the condensers and the glass body 13 there is placed a partly silvered glass plate 30.

One-half of the area of the object 23 is covered by a mask 31 which has a reflecting surface 33 and one-half of the area of the object 24 is covered by a mask 32 having a reflecting surface 34. The surfaces 33 and 34 are at an angle of forty five degrees to the optical axes through the condensers.

As shown in the drawing, the light rays from the lamp are reflected by the plate 30 upon the objects. Those rays which are directed against the reflecting surfaces 33 and 34 are reflected out of the device as indicated by the arrows. The other rays from the lamp which illuminate the objects are diffusedly reflected from the objects and a certain portion of said rays pass through the plate 30 to the glass body 13 and to the reflecting surface 14 where about one half of these other image forming rays are reflected into the optical system of the microscope. In the latter the two images of the two objects are formed and appear in side by side relation with a sharp dividing line between them which line is an image of the lower edges of the inclined surfaces 33 and 34 of the masks 31 and 32.

The masks 31 and 32 may be metal plates with polished surfaces 33 and 34. Fig. 3 shows a modification in which a plane parallel glass plate 40 is placed over the object adjacent the mask 41. The glass plate has a reflecting surface 42 for reflecting the rays to one side away from the apparatus.

The disclosure herein possesses several advantages. As shown and described it is clear that in order to examine two objects an ordinary microscope with a single objective may be used which includes the further advantage that, with a microscope already at hand, it is only necessary to procure the base arrangement of this device and then use the microscope tube therewith. If a stereomicroscope is used only two objectives are necessary with this invention. It is also within the scope of the invention to substitute a clear plano-parallel glass glate for the partly silvered glass plate shown in Figure 2.

We claim.

1. A comparison microscope for simultaneously comparing the images of two objects comprising a housing having two apertures at an angle to each other through which the objects appear, a lamp for illuminating the objects through said apertures, means for supporting the microscope in position to receive the image forming light rays from the illuminated objects, a glass body interposed between the objects and the microscope in the paths of the light rays from the illuminated objects, said glass body having a semi-transparent, semi-reflecting surface therein for directing the image forming light rays from the illuminated objects to pass by transmission from one of the said objects and by reflection from the other of said objects into the optical system of the microscope, an optical system in the microscope for forming the images of the objects therein, said system including an objective and means in said housing for supporting said glass body and surface in optical operative relation to the objects and the microscope between the objects and the said objective to direct the image forming light rays as aforesaid.

2. In a comparison microscope for comparing the images of two objects, an optical system for forming the images of the objects including an objective, a lamp for illuminating the objects, a mask for each object for covering one half of the object area, each mask having a reflecting surface, a plane parallel glass semi-transparent, semi-reflecting plate interposed between the lamp and the objects on the one side and the said optical system on the other side for reflecting some of the light rays from the lamp into the said mask reflecting surfaces to be reflected away from said microscope and for transmitting the light rays from the illuminated objects towards the said optical system, a glass body between said glass plate and the said optical system, said glass body having a partly silvered surface for directing the two bundles of light rays transmitted by said plane parallel glass plate in side by side relation into the optical system for comparison purposes.

3. A comparison microscope for simultaneously comparing the images of two objects comprising a housing having two apertures at an angle to each other to expose one object through each aperture to view through the microscope, means for illuminating the objects, an optical system in the microscope for forming the images of the two objects in side by side relation for viewing by an observer, said system including an objective directed towards one of said objects, a semi-transparent, semi-reflecting surface positioned between said objective and said objects for directing the image forming light rays from the illuminated objects to pass by transmission and reflection into said objective and optical system of the microscope, and a mask for each object to cover complemental portions thereof leaving uncovered complemental portions of each object exposed for view and comparison, each mask having a reflecting surface at an angle to the optical axis of the microscope for the corresponding object, said mask reflecting surfaces terminating in elongated edges extending in parallelism to provide a sharp line of division between the images of the two objects as viewed.

4. A comparison microscope for simultaneously comparing the images of two objects comprising a housing having two apertures at susbtantially right angles to each other to expose one object through each aperture for view through the microscope, an optical system in the microscope for forming the images of the two objects in side by side relationship for viewing by an observer, said optical system including an objective directed towards one of said apertures, a semi-transparent, semi-reflecting surface supported in forty-five degrees relationship to the optical axis of the objective permitting light rays from the object exposed through said last mentioned aperture to pass through said surface while reflecting the light rays from an object exposed through the other aperture, a lamp in said housing, means for directing the light from said lamp to the respective objects, and a mask in the housing for each object, each mask being adapted to cover complemental portions of each object as viewed through the microscope leaving the uncovered complemental portions of each object exposed for view and comparison in the microscope, each mask having a reflecting surface disposed at forty-five degrees to the optical axis through the microscope for the corresponding object, said reflecting surfaces terminating in elongated edges which latter extend in parallelism thereby providing a sharp line of division between the images of the two objects as viewed.

FRITZ MEINHARDT.
HANS FRICKE.